United States Patent [19]

Attwood

[11] 4,336,500

[45] Jun. 22, 1982

[54] MSK DEMODULATOR FREQUENCY ACQUISTION APPARATUS AND METHOD

[75] Inventor: Stanley W. Attwood, Scottsdale, Ariz.

[73] Assignee: Motorola, Inc., Schaumburg, Ill.

[21] Appl. No.: 167,895

[22] Filed: Jul. 14, 1980

[51] Int. Cl.³ .............................................. H04L 27/22
[52] U.S. Cl. ..................................... 329/50; 329/122; 331/12; 331/17; 331/25
[58] Field of Search ......................... 329/50, 122, 124; 331/11, 12, 10, 17, 25, 23; 375/81, 120

[56] References Cited

U.S. PATENT DOCUMENTS 3,768,030 10/1973 Brown et al. ......................... 331/12
4,092,606 5/1978 Ryan .................................... 329/124
4,188,589 2/1980 Brown et al. .................... 329/122 X

*Primary Examiner*—Siegfried H. Grimm
*Attorney, Agent, or Firm*—Eugene A. Parsons

[57] ABSTRACT

A phase shift keyed (PSK) demodulator includes a closed loop wherein a phase error signal is generated to control a voltage controlled oscillator (VCO) to track the carrier frequency of an input signal for demodulation. A frequency discriminator is incorporated with the PSK demodulator to provide a frequency error voltage which is also applied to the VCO to improve the tracking of the carrier frequency by substantially eliminating false locks and removing the dependence of the apparatus on the modulation of the received signal.

7 Claims, 2 Drawing Figures

MSK DEMODULATOR FREQUENCY ACQUISTION APPARATUS AND METHOD

BACKGROUND OF THE INVENTION

When receiving signals, such as biphase modulated (BPSK) or quadraphase modulated (QPSK) suppressed carrier signals, hereinafter generally referred to as PSK (Phase Shift Keyed) signals, it is necessary for the demodulation and recovery of the carrier signal to utilize a circuit such as a Costas demodulator. It is characteristic of this type of demodulator that during acquisition, the carrier tracking loop may false lock at a frequency that is displaced from the true received carrier frequency by an amount equal to plus or minus a harmonic or a subharmonic of the clock frequency of the data channels. Unless positive steps are taken, apart from the conventional structure of the demodulator, the false lock will be maintained and the data cannot be recovered.

A method of removing this likelihood of false lock is to use some form of frequency discriminator to positively drive the voltage controlled oscillator (VCO) of the demodulator to the correct frequency so that phase locking will occur only on the desired received carrier frequency. Apparatus to accomplish this is described in U.S. Pat. No. 3,768,030, entitled "Automatic Signal Acquisition Means For Phase Lock Loop With Anti-Sideband Lock Protection", issued Oct. 23, 1973. A further improvement on this structure is disclosed in U.S. Pat. No. 4,188,589, entitled "Automatic Signal Acquisition Means For a Phase Locked Loop With Anti-Sideband Lock Protection", issued Feb. 12, 1980. In the latter patent two all-pass networks are included with are designed such that a 90° phase shift is produced in a signal passing through one of the networks with respect to a signal passing through the other of the networks. When outputs of these two networks are multiplied the resulting low frequency response is essentially a constant positive voltage when the incoming carrier frequency is greater than the VCO frequency and a constant negative voltage when the received carrier frequency is below the VCO frequency, whenever the frequency difference between the incoming carrier frequency and the VCO frequency lies between a lower frequency, $f_L$, and an upper frequency, $f_H$, for the apparatus. This step function discriminator can be designed to override any false lock voltages that could be developed by the phase locking circuits.

Below $f_L$ the discriminator characteristic becomes linear and vanishes within the loop bandwidth of the phase locked loop. Above $f_H$ the discriminator action also vanishes. $f_H$ is chosen to encompass the expected offset frequency plus the modulation bandwidth. $f_L$ is chosen to be below any false lock points and above the phase locked loop (PLL) bandwidth. In the latter case where incompatibility exists a compromise choice of $f_L$ will lead to an acceptable solution.

In this prior art structure two problems arise. First, when the received carrier is modulated at a data rate large compared to the carrier frequency offset the step function nature of the discriminator becomes nominally linear with greatly reduced gain. In these instances false locks may occur. Second, when the modulation is a biphase (Bi$\phi$) (or Manchester) format the gain may be reduced to zero. In these instances false locks will occur. Thus, in these prior art devices the frequency discriminator action is dependent on the modulation of the received signal.

SUMMARY OF THE INVENTION

The present invention pertains to an improved frequency discriminator for use in conjunction with a BPSK demodulator wherein in-phase and quadrature channel outputs of the demodulator are detected and combined to provide an amplitude signal which is proportional to the absolute value of the demodulated signal, phase shifting means including all-pass networks are utilized to shift the phase of the amplitude signal and a phase error signal from the demodulator generally into phase with each other, and the in-phase signals are multiplied to produce a frequency error signal which is independent of the type or frequency of modulation of the received signal.

It is an object of the present invention to provide new and improved frequency discriminator apparatus in conjunction with a PSK demodulator.

It is a further object of the present invention to provide new and improved frequency discriminator apparatus in conjunction with a PSK demodulator for producing a demodulator that is capable of being used for BPSK, QPSK, unbalanced QPSK, PSK signals using more than two phases, etc. (all of which will hereinafter be included in the general term MSK, multi-phase shift keyed, signal) regardless of the data format on any data channel or any data rate.

It is a further object of the present invention to provide an MSK demodulator incorporating a new and improved frequency discriminator that is essentially independent of the modulation of the received signal.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1:
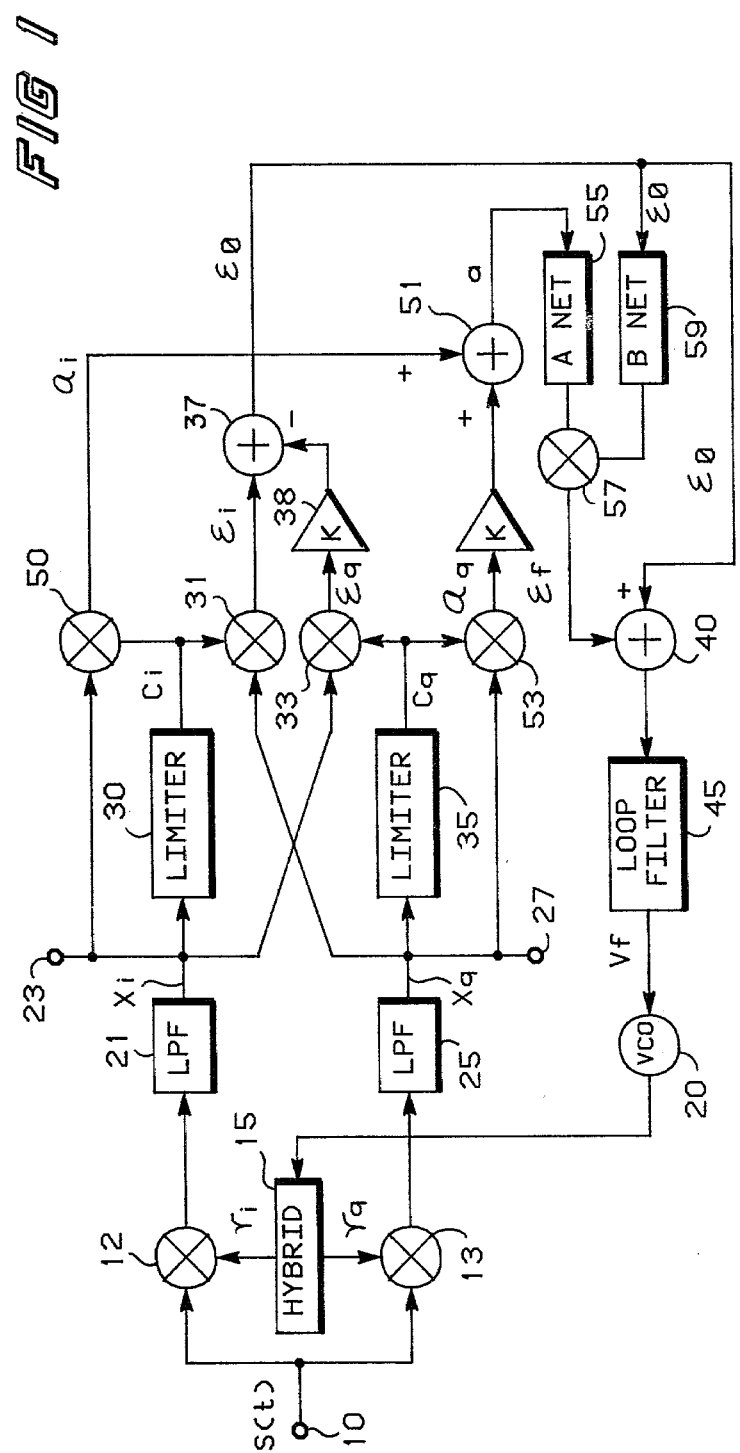
FIG. 1 is a block diagram of an MSK demodulator incorporating a frequency discriminator embodying the present invention.

Referring specifically to FIG. 1, an input terminal 10, adapted to have an input signal applied thereto, is connected to one input of each of a pair of mixers, which in this embodiment are illustrated as multipliers 12 and 13. Each of the multipliers 12 and 13 has a second input connected to quadrature outputs of a hybrid circuit 15. A voltage controlled oscillator 20 has an output connected to an input of the hybrid circuit 15 and supplies a signal thereto which is substantially similar in frequency to the carrier of the signal applied to the input terminal 10. The signal applied to the multiplier 12 from the hybrid 15 is an in-phase version of the carrier signal and the mixed or multiplied components of the input signal and the in-phase version of the oscillator 20 output are coupled through a low-pass filter 21 to an output terminal 23, which terminal 23 is referred to as the I channel output. A quadrature, or 90° phase shifted, version of the oscillator 20 output is supplied from the hybrid circuit 15 to the multiplier 13 where it is mixed with the input signal and the components are coupled through a low-pass filter 25 to an output terminal 27, which output terminal 27 is referred to as the Q channel output. Assuming that the oscillator 20 is at the frequency of the carrier for the input signal at terminal 10, modulating data appearing at the input terminal 10 will be available at the output terminals 23 and 27.

The output signal at the terminal 23 is supplied through a limiter 30 to one input of a multiplier 31 and directly to an input of a second multiplier 33. The output signal at the output terminal 27 is connected directly to a second input of the multiplier 31 and through a limiter 35 to a second input of the multiplier 33. The output of the multiplier 31 is connected directly to a combining circuit, which in this embodiment is an adder 37, and the output of the multiplier 33 is connected through an amplifier 38 to a second input of the adder 37. The amplified output of the multiplier 33 is added negatively to the output of the multiplier 31 so that the output of the adder 37 is the difference between the two signals. The output of the combining circuit 37 is a phase error signal which is coupled through a combining circuit 40 and a loop filter 45 to a control terminal of the voltage controlled oscillator 20. The filtered phase error signal applied to the oscillator 20 is utilized to control the phase of the oscillator 20 so that it is substantially equal to the phase of the carrier of the input signal at terminal 10.

The portion of the circuitry which has been described is generally referred to as a Costas demodulator with limiters and is generally satisfactory for demodulating phase shift keyed (PSK) signals which are applied to the input terminal 10. However, this circuit by itself has a tendency to lock onto harmonics or subharmonics of the carrier frequency, as previously described.

The output signal at the terminal 23 is also connected to one input of a multiplier 50 and the output of the limiter 30 is connected to a second input thereof. An output of the multiplier 50 is connected to a combining circuit 51. The output signal at the terminal 27 is also connected to an input of a multiplier 53 and a second input of the multiplier 53 is connected to the output of the limiter 35. An output of the multiplier 53 is connected through an amplifier 54 to a second input of the combining circuit 51. The amplified signal from the multiplier 53 and the signal from the multiplier 50 are added in the combining circuit 51 and the output is applied through a phase shifting network 55 to one input of a multiplier 57. The phase error signal from the combining circuit 37 is connected through a second phase shifting network 59 to a second input of the multiplier 57. The output of the multiplier 57 is connected to a second input of the combining circuit 40 where it is added to the phase error signal from the combining circuit 37.

In the operation of the circuitry described, assume that S(t) is the input signal and is defined as $$S(t) = D_i(t) \cos(\omega_i t + \theta_i) + kD_q(t) \sin(\omega_i t + \theta_i)$$

$D_i$ and $D_q$ are the I and Q data streams,
$k^2$ is the power ratio of the Q to I data channels (k=0 corresponds to BPSK),
$\omega_i$ is the incoming carrier frequency, and
$\theta_i$ is the carrier phase.

The signals supplied to the multipliers 12 and 13, respectively, from the hybrid circuit 15 are defined as $$r_i(t) = 2 \cos(\omega_o t + \theta_o)$$

$$r_q(t) = 2 \sin(\omega_o t + \theta_o)$$

$\omega_o$ = local oscillator frequency, and
$\theta_o$ = local oscillator phase.

If the difference in phase between the output signal of the oscillator 20 and the carrier of the input signal at the terminal 10 is defined as $\phi$ and $$\phi = \theta_i - \theta_o + (\omega_i - \omega_o)t$$

then the output signals at the output terminals 23 and 27 will be $$X_i = D_i \cos\phi + kD_q \sin\phi$$

$$X_q = -D_i \sin\phi + kD_q \cos\phi$$

Here it can be seen that if the phases of the oscillator 20 and the carrier of the input signal at the terminal 10 are equal $\phi$ will be equal to zero and the signal at the output terminal 23 will be $D_i$ and the signal at the output terminal 27 will be $kD_q$.

Hard limiting the output signal at the terminals 23 and 27, in the limiters 30 and 35, provides a signal at the outputs thereof which is essentially equal to the sign of the output signals. That is, the output signals at the terminals 23 and 27 will be varying about some reference value (generally zero) and the output of the limiters 30 and 35 will simply be an indication as to whether the output signal is above or below zero, hence the signals at the outputs of the limiters 30 and 35 will simply be an indication of the sign of the output signals at the terminals 23 and 27, respectively. Multiplying the sign of the output signal by the output signal in the multipliers 50 and 53 produces a product which is a signal proportional to the absolute value of the output signals, respectively. Thus, $$C_i = sgn(x_i)$$

$$C_q = sgn(x_q)$$

$$a_i = |x_i|$$

$$a_q = |x_q|$$

Here it should be noted that the values $a_i$ and $a_q$ may be formed by linear envelope detectors or in a variety of other ways well known to those skilled in the art.

The in-phase error signal from the multiplier 31 and the amplified quadrature error signal from the multiplier 33 are combined in the combining circuit 37 as follows:

$$\epsilon_i = C_i x_q$$

$$\epsilon_q = C_q x_i$$

$$\epsilon_\phi = \epsilon_i - K\epsilon_q$$

The result of this combination is the phase error signal which is supplied to the phase shifting network 59 and to one input of the combining circuit 40. The in-phase absolute value and the amplified quadrature absolute value are combined in the combining circuit 51 as follows:

$$a = a_i + Ka_q$$

It should be noted that the phase error signal, $\epsilon_\phi$, is essentially a half sine wave and the absolute signal, a, is essentially a half cosine wave.

The phase shifting networks 55 and 59, which are all-pass networks, may be constructed in accordance with the teachings of the above referenced U.S. Pat. No. 4,188,589, or may be constructed in a variety of embodiments well known to those skilled in the art. The phase shifting networks 55 and 59 are essentially constructed so that the signals applied thereto are shifted into phase with reference to each other. Thus, if the phase error signal, $\epsilon_\phi$, is a sine wave and the absolute signal, a, is a cosine wave the two signals are in phase quadrature. The phase networks 55 and 59 thus will shift the fundamental of one of the signals 90° relative to the fundamental of the other signal so that they are both in-phase with each other.

Figure 2:
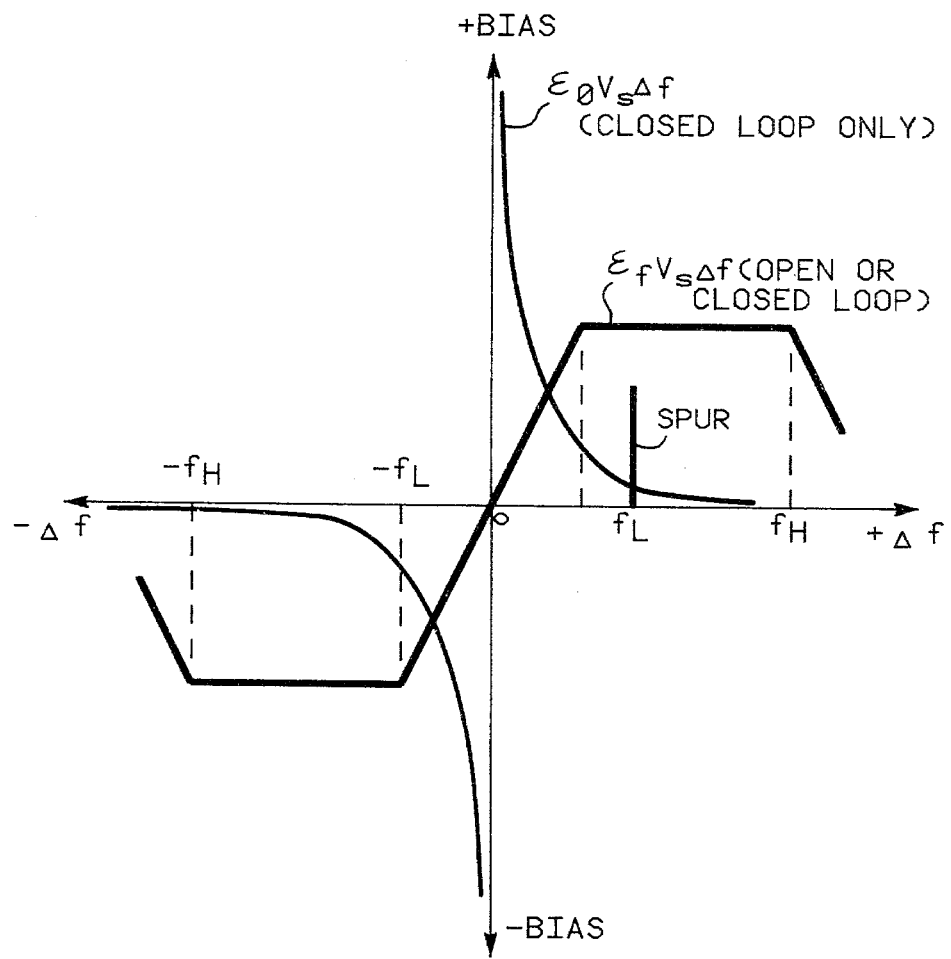
FIG. 2 depicts typical curves for portions of the circuitry illustrated in FIG. 1.

With the two signals in-phase the multiplier 57 will produce a signal which contains a DC component and higher harmonics. The higher harmonics will be filtered in the loop filter 45 and the DC component will be a relatively large component, referred to herein as a frequency error $\epsilon_f$, which will override all other signals applied to the oscillator 20, including the phase error signal $\epsilon_\phi$, during acquisition. When K, the amplification factor in amplifiers 38 and 54, is approximately equal to k then $$\epsilon_\phi \sim \begin{cases} \sin 2\phi & \phi \sim 0, \pi \\ \cos 2\phi & \phi \sim \frac{\pi}{2}, \frac{3\pi}{2} \end{cases}$$

$$a \sim \begin{cases} \cos 2\phi & \phi \sim 0, \pi \\ \sin 2\phi & \phi \sim \frac{\pi}{2}, \frac{3\pi}{2} \end{cases}$$

and the frequency error signal, $\epsilon_f$, is essentially independent of the modulation format of the input signal at terminal 10. It can be seen from the above relationship that the signals $\epsilon_\phi$ and a are essentially of a CW nature at the inputs of the phase shifting networks 55 and 59. Therefore by shifting, for example, $\epsilon_\phi$ by 90° with respect to a, a product is formed in the multiplier 57 which is essentially a constant and has the sign of $\Delta f$ where $\Delta f$ is $f_i - f_o$, so long as $F_L < |\Delta f| < F_H$.
$f_i$ = frequency of input signal carrier
$f_o$ = frequency of local oscillator Referring specifically to FIG. 2, waveforms approximating the mean value of the phase error signal, $\epsilon_\phi$, and the frequency error signal, $\epsilon_f$, are illustrated on a graph wherein difference frequency, $\Delta f$, is represented by the abscissa and the bias or control signal applied to the oscillator 20 is represented by the ordinate. From the graph, or waveforms, of FIG. 2 it can be seen that the frequency error signal, $\epsilon_f$, overrides any spurs (harmonics or subharmonics) in the circuitry during acquisition and, as the frequency of the oscillator 20 approaches the frequency of the carrier for the input signal at the terminal 10 the phase error signal, $\epsilon_\phi$ increases to the point that it overcomes the frequency error signal, $\epsilon_f$, and gradually drives the oscillator 20 substantially into phase with the carrier of the signal at the input terminal 10. It will of course be understood by those skilled in the art that the circuitry may be designed so that the error frequency signal, $\epsilon_f$, approaches much closer to the ordinate (0) before crossing over to the opposite sign.

Thus, an MSK demodulator is demonstrated with a frequency discriminator incorporated therein to prevent false locks and to provide the capability of demodulating MSK signals, regardless of the data format on any data channel or any data rate. The major advantage of the present demodulator is that it removes the dependence of the frequency discriminator action on the modulation of the received signal. The gain remains high for all combinations of data formats. Further, the circuitry described avoids complex networks and can be a very wide band demodulator.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. In conjunction with a PSK demodulator, a frequency discriminator for preventing false lock comprising:
    (a) detection means connected to the demodulator for developing an amplitude signal which is proportional to the absolute value of the demodulated signal;
    (b) phase shifting means connected to receive the amplitude signal from said detection means and connected to receive a phase error signal from the demodulator for shifting the phase of one of the phase error signal and the amplitude signal with respect to the other;
    (c) multiplying means for receiving the one phase shifted signal and the other signal from said phase shifting means and providing a frequency error signal at an output thereof; and
    (d) means for combining the frequency error signal with the phase error signal in the demodulator for controlling the demodulator to lock onto the corrent carrier frequency.

2. A frequency discriminator as claimed in claim 1 wherein the detecting means includes a first detector being connected to an I channel output of the demodulator and providing a signal proportional to the absolute value of the I channel output signal, a second detector being connected to a Q channel output of the demodulator and providing a signal proportional to the absolute value of the Q channel output signal, and combining means connected to receive the I and Q proportional signals and provide the amplitude signal.

3. A frequency discriminator as claimed in claim 2 wherein each of the first and second detectors include a multiplier having a first input connected to receive the output signal and a second input connected to receive the output signal after passing through a limiter in the demodulator.

4. A frequency discriminator as claimed in claim 1 wherein the phase shifting means includes two all-pass networks, one connected to receive the phase error signal and one connected to receive the amplitude signal.

5. MSK demodulator frequency acquisition means comprising:
    (a) a PSK demodulator including a voltage controlled oscillator with the output connected through a 90° phase splitter, I and Q channels each connected to receive an input signal and one of the signals from said phase splitter, said I and Q channels each including means for providing demodulated output signals and error signals, and means for combining the error signals from each channel into a phase error signal;

(b) first and second detectors connected to receive the demodulated output signals from said I and Q channels and provide signals proportional to the absolute values of the demodulated output signals;

(c) first combining means connected to receive the absolute value signals from said first and second detectors and combining the absolute value signals to provide an amplitude signal;

(d) a first all-pass network connected to receive the amplitude signal from said combining means and to provide a phase shifted output signal;

(e) a second all-pass network connected to receive the phase error signal from said PSK demodulator and to provide a phase shifted output signal, the phases of the output signals from said first and second all-pass networks being shifted so that the output signals are substantially in-phase;

(f) multiplying means connected to receive the output signals from said first and second all-pass networks and provide a frequency error signal at an output thereof; and (g) second combining means connected to receive the frequency error signal from said multiplying means and the phase error signal from said PSK demodulator and supplying a control signal to said voltage controlled oscillator for controlling the frequency of the output of said oscillator to approximately the frequency of the input signal.

6. In MSK demodulator frequency acquisition means a method of controlling a voltage controlled oscillator to track the carrier frequency of an input signal comprising the steps of:

(a) mixing the output signal of the voltage controlled oscillator with the input signal to provide demodulated output signals;

(b) generating a phase error signal from the demodulated output signals;

(c) detecting the demodulated output signals and combining to generate an amplitude signal proportional to the absolute value of the demodulated output signals;

(d) combining the amplitude signal with the phase error signal to generate a frequency error signal; and (e) controlling the voltage controlled oscillator with the phase and frequency error signals.

7. A method as claimed in claim 6 wherein the step of combining the amplitude and phase error signals includes:

(a) shifting the phase of the phase error signal and the amplitude signal so that the signals are substantially in-phase; and (b) multiplying the phase shifted amplitude signal and phase error signal to generate a frequency error signal.

* * * * *